(12) United States Patent
Becker et al.

(10) Patent No.: US 8,831,547 B2
(45) Date of Patent: Sep. 9, 2014

(54) MULTI-ANTENNA SYSTEM

(71) Applicant: Harman Becker Automotive Systems GmbH, Karlsbad (DE)

(72) Inventors: Karl-Anton Becker, Karlsbad (DE); Achim Ratzel, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/870,643

(22) Filed: Apr. 25, 2013

(65) Prior Publication Data

US 2013/0288618 A1 Oct. 31, 2013

(30) Foreign Application Priority Data

Apr. 26, 2012 (EP) .................................... 12165711

(51) Int. Cl.
| | |
|---|---|
| H04B 1/06 | (2006.01) |
| H01Q 21/30 | (2006.01) |
| H04B 1/00 | (2006.01) |
| H04B 1/18 | (2006.01) |
| H04B 1/40 | (2006.01) |
| H03C 7/02 | (2006.01) |

(52) U.S. Cl.
CPC ............... *H04B 1/40* (2013.01); *H01Q 21/30* (2013.01); *H04B 1/0064* (2013.01); *H04B 1/18* (2013.01)
USPC .......................................... 455/277.1; 455/132

(58) Field of Classification Search
USPC ............... 455/132–136, 277.1–277.2, 562.1
See application file for complete search history.

(56) References Cited

U.S. PATENT DOCUMENTS

| | | |
|---|---|---|
| 5,649,308 A | 7/1997 | Andrews |
| 7,277,056 B1 | 10/2007 | Thiam et al. |
| 2004/0116084 A1 | 6/2004 | Ward et al. |
| 2006/0116097 A1 | 6/2006 | Thompson |
| 2006/0145884 A1 | 7/2006 | Graham et al. |
| 2006/0205369 A1 | 9/2006 | Schaich et al. |
| 2007/0152675 A1 | 7/2007 | Thole et al. |
| 2010/0074370 A1 | 3/2010 | Gerlach et al. |

FOREIGN PATENT DOCUMENTS

| | | |
|---|---|---|
| DE | 4130608 C1 | 8/1992 |
| WO | 2011026522 A1 | 3/2011 |

OTHER PUBLICATIONS

European Search Report for corresponding Application No. 12165711.8, mailed Oct. 4, 2012, 7 pages.

*Primary Examiner* — Lee Nguyen
(74) *Attorney, Agent, or Firm* — Brooks Kushman P.C.

(57) ABSTRACT

An antenna system is disclosed that includes a frontend portion and a backend portion. The frontend portion includes multiple antennas that supply antenna signals, a first control unit for controlling the frontend portion dependent on control signals received from the backend portion, and a first crossover network that connects a feed line to the first crossover network and the first control unit. The backend portion includes multiple receivers, a second control unit that provides the control signals for the first control unit, and a second crossover network that connects the feed line to the second crossover network and the receivers. The frontend portion is configured to transmit via the feed line antenna signals to the backend portion in a certain frequency range. The backend portion is configured to transmit the control signals to the frontend portion in a frequency range other than the certain frequency range.

18 Claims, 2 Drawing Sheets

MULTI-ANTENNA SYSTEM

CROSS-REFERENCE TO RELATED APPLICATIONS

This application claims priority to EP Application No. 12 165 711.8-2411 filed on Apr. 26, 2012, the disclosure of which is incorporated in its entirety by reference herein.

TECHNICAL FIELD

This invention relates to radio frequency antennas, specifically to a multiple-antenna system which is capable of operating in multiple frequency ranges.

BACKGROUND

An antenna is usually connected to a transmitter or receiver by way of a feed line. Antennas for use at radio frequencies are effective over a limited frequency range. When operation is required over a wide frequency range it is common to use multiple antennas with each antenna optimized for a specific narrow band of frequencies. The desired antenna is manually selected by a switch or other means that connects that antenna's feed line to the transmitter or receiver.

If the antenna is a so-called active antenna (i.e., includes an antenna (pre-) amplifier), the antenna amplifier can easily be supplied with power and switched on and off on an individual basis in order to save power when the antenna is not used. Furthermore, an antenna diagnosis can be simply performed for each individual antenna. However, in such an antenna system for each antenna an individual feed line must be provided making such a system costly, space consuming and heavy, thus, less suitable for automotive applications.

Also common are systems in which multiple (active) antennas are connected to multiple receivers and/or transmitters via a single feed line. When using a single feed line, however, antenna selection, power supply, on/off switching of active antennas and antenna diagnosis are difficult to realize, provided they can be realized at all. Thus, there is a need to provide a multi-band, multi-antenna system that overcomes the above-mentioned drawbacks.

SUMMARY

An antenna system is disclosed that includes a frontend portion and a backend portion connected to each other by a feed line. The frontend portion includes multiple antennas that supply antenna signals, a first control unit for controlling the frontend portion dependent on control signals received from the backend portion, and at least one first crossover network that connects the feed line to the at least one first crossover network and the first control unit. The backend portion includes multiple receivers, a second control unit that provides the control signals for the first control unit, and at least one second crossover network that connects the feed line to the at least one second crossover network and the receivers. The frontend and backend portions are configured to transmit via the feed line antenna signals from the frontend portion to the backend portion in certain frequency ranges and to transmit the control signals from the backend portion to the frontend portion in a frequency range other than the certain frequency ranges.

BRIEF DESCRIPTION OF THE DRAWINGS

Various specific embodiments are described in more detail below based on the exemplary embodiments shown in the figures of the drawing. Unless stated otherwise, similar or identical components are labeled in all of the figures with the same reference numbers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
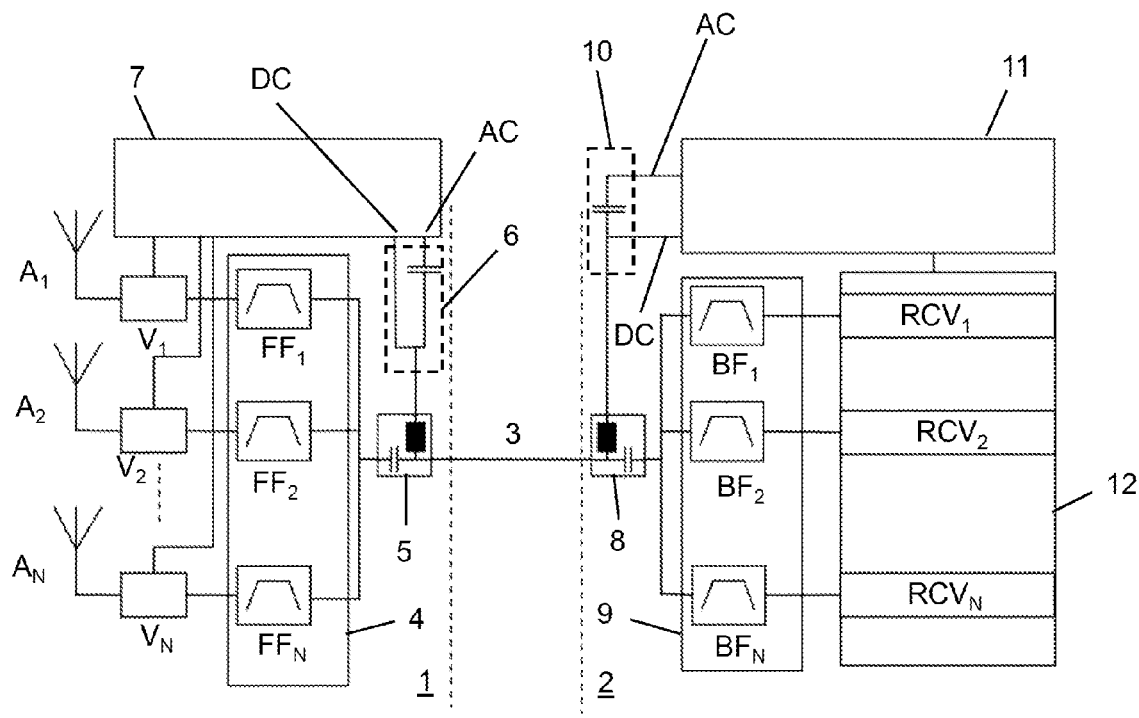
FIG. 1 is a block diagram illustrating an improved multi-band, multi-antenna system that includes a frontend portion and a backend portion.

Referring to FIG. 1, an exemplary improved multi-band, multi-antenna system includes a frontend portion 1 and a backend portion 2 that are connected via a feed line 3 (e.g., a co-axial cable). The frontend portion 1 includes N antennas $A_1, A_2 \ldots A_N$ each antenna being optimized for a specific frequency band and antenna amplifiers $V_1, V_2 \ldots V_N$ that are each connected between one of the N antennas and a crossover network 4. The crossover network 4 may include N bandpass filters $FF_1, FF_2 \ldots FF_N$ that are connected downstream of the antenna amplifiers $V_1, V_2 \ldots V_N$ and whose outputs are connected with each other to form an output of the crossover network 4. The output of the crossover network 4 is connected to the feed line 3 via a crossover network 5 (e.g., a bias-T (highpass-lowpass network)), which is further connected to a control unit 7 via a splitter network 6 that splits off useful AC signals from a DC supply voltage and that may include only a capacitor in the example shown, but may also include more sophisticated highpass and lowpass filters if desired. "Useful" in this regard should mean that the AC signal carries information that is evaluated by the control unit 7. Splitter networks and combiner networks as described herein are specific types of crossover networks.

The control unit 7, which is supplied with the DC supply voltage from the splitter network 6, evaluates the useful AC signals received from the splitter network 6 and controls, dependant on the evaluated AC signals, the antenna amplifiers $V_1, V_2 \ldots V_N$. Control of the antenna amplifiers $V_1, V_2 \ldots V_N$ may include at least one of adjusting the bias point, switching on/off, and adjusting the gain.

The backend portion 2 includes a crossover network 8 that connects the feed line 3 with a crossover network 9 and a combiner network 10. The combiner network 10 combines (i.e., superimposes) the DC supply voltage with the useful AC signal, both provided by a control unit 11. The crossover network 9 may include N bandpass filters $BF_1, BF_2 \ldots BF_N$ whose inputs are connected with each other to form an input of the crossover network 9. The outputs of the bandpass filters $BF_1, BF_2 \ldots BF_N$ are connected to N receivers $RCV_1, RCV_2 \ldots RCV_N$ that may be, for example, AM/FM, DAB, TV as DVB, CMMB, ATSC, ISDB-T or other standards and/or satellite receivers and that form part of a multi-standard receiver block 12. The backend portion 2 may be included in, for example, a head portion for automobiles.

The receivers $RCV_1$, $RCV_2$ ... $RCV_N$ may also supply signals to the control unit 11 that represent, for example, the level (and quality information) of the signals received by the receivers $RCV_1$, $RCV_2$ ... $RCV_N$, time slicing and antenna identification information. The control unit 11 may calculate antenna input switch configurations, supply voltage switches (for the amplifiers), diagnosis switches, gain control and/or filter settings and modulate the control signal, for example, on one or several carriers or a spread spectrum signal which forms the control AC signal. This control AC signal is supplied via the combiner 10, in which it is superimposed with the DC supply voltage, and the crossover network 8, and it is combined with the signals on the fed line 3. These combined signals are transmitted via the feed line 3 to the frontend portion 1.

In the frontend portion 1, the blend of signals (e.g., combined/superimposed signals) transmitted via the feed line 3 is split off in the individual signals and the DC voltage by way of the crossover network 4, 5 and the splitter 6. The control AC signal delivers the information from the receivers $RCV_1$, $RCV_2$ ... $RCV_N$ via the control unit 11 and feed line 3 and splitters to the control unit 7, which may adjust the bias point, individually switch on and off the antenna amplifiers $V_1, V_2 ... V_N$, and/or adjust their gain and/or switch diagnosis configurations. For instance, if the level of the signals to be received by one of the antennas $A_1, A_2 ... A_N$ is too low, the bias point of the corresponding one of the antenna amplifiers $V_1, V_2 ... V_N$ is adjusted in a manner that the supply current and, thus, the noise produced by the amplifier is reduced. If the level of the signals to be received by one of the antennas $A_1, A_2 ... A_N$ is too high or disturbing signals are received at a high level, the gain of the respective antenna amplifier $V_1$, $V_2 ... V_N$ may be reduced. If one of the antennas $A_1, A_2 ... A_N$ is temporarily not intended to be used, the corresponding one of the antenna amplifiers $V_1, V_2 ... V_N$, may be switched off.

If a signal received by an antenna employs a broadcast standard using "time slicing" (e.g., DVB-H or CMMB), the relating antenna control signal may be transmitted between the control units 7 and 11 accordingly. If the antenna amplifiers $V_1 ... V_N$ require different supply voltages, voltage converters may be employed. For instance, the DC voltage transmitted via feed line 3 may be the highest supply voltage that is required and lower voltages are derived from the highest supply voltage by voltage dividers or voltage regulators.

Figure 2:
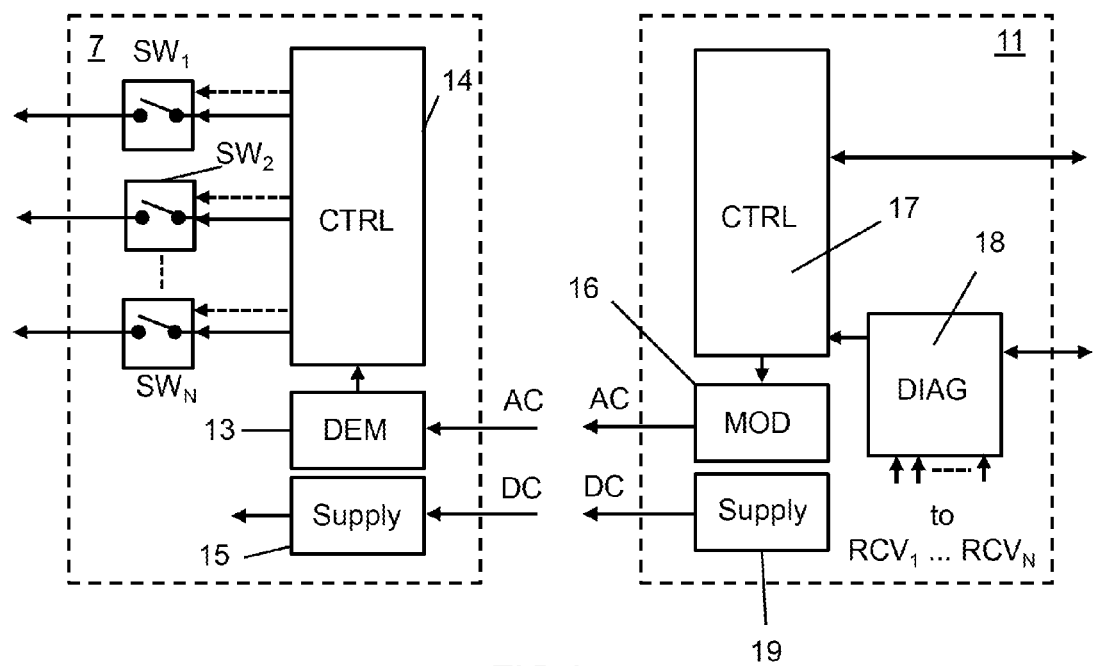
FIG. 2 is a block diagram illustrating a pair of control units that are applicable in the frontend portion and the backend portion in the system of FIG. 1.

With reference to FIG. 2, an exemplary pair of control units 7 and 11 applicable in the system of FIG. 1 is explained below in more detail. The control unit 7 for the frontend portion 1 includes a demodulator 13 that demodulates the useful AC signal and supplies the demodulated signal to a controller 14. The controller 14 may be digital or analog circuitry or a blend of both. The modulation used may be any type of modulation of a single carrier or multiple carriers. The demodulated signals are evaluated and translated into instruction signals and antenna identifiers so that, for example, a certain antenna may be switched off and another antenna's bias point and/or gain is adjusted dependent on the useful AC signal. Adjusting the bias point and/or gain may be performed by varying the supply voltage/current, whereby switching off the supply currents may be performed by way of controllable switches $SW_1, SW_2 ... SW_N$ that are controlled by controller 14. A voltage regulator 15 generates from the DC voltage the supply voltage for the demodulator 13, controller 14, switches $SW_1, SW_2 ... SW_N$ and, maybe, other circuitry (not shown).

The control unit 11 for the backend portion 2 includes a modulator 16 that provides the control AC signal by modulating a carrier signal with a signal from a controller 17. The controller 17 receives the information carrying signals from the receivers $RCV_1, RCV_2 ... RCV_N$ and may be digital or analog circuitry or a blend of both. The carrier signal is modulated with the signal(s) from the controller 17 resulting in the useful AC signal being transmitted to the frontend portion 1. The control unit 11 also includes a diagnosis unit 18 that is connected to the controller 17 and the receivers $RCV_1$, $RCV_2 ... RCV_N$. The diagnosis unit 18 may elect one of the antennas $A_1, A_2 ... A_N$ and the respective one of the antenna amplifiers $V_1, V_2 ... V_N$ by switching off all other antennas and amplifiers and run a diagnosis procedure, for example, measuring for the only one active antenna-amplifier at least one of the current consumption, noise, signal strength, etc. A voltage source 19 provides the DC voltage.

Figure 3:
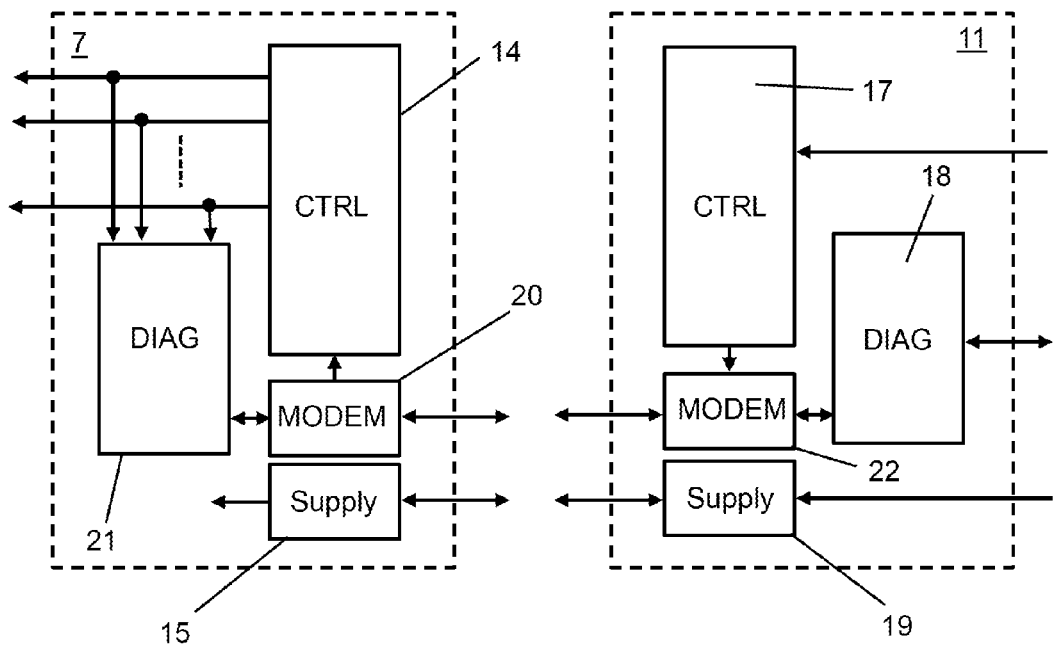
FIG. 3 is a block diagram illustrating another pair of control units that are applicable in the frontend portion and the backend portion in the system of FIG. 1.

Another exemplary pair of control units 7 and 11 applicable in the system of FIG. 1 will now be described with reference to FIG. 3. The frontend portion 1 shown in FIG. 3 differs from the one shown in FIG. 2 in that the demodulator 13 is substituted by a modem 20 which is a combination of a modulator and a de-modulator, and in that the frontend portion 1 also schedules a diagnosis unit 21. Switches $SW_1$, $SW_2 ... SW_N$ as shown in the system of FIG. 2, may be provided as well but have been omitted in the present example. The backend portion 2 is similar to the one shown in FIG. 2 whereby the modulator is substituted by a modem 22 to allow for bi-directional communication with modem 20 in the frontend portion 1. Consequently, information may be transferred not only from the backend portion 2 to frontend portion 1, but also vice versa, for example, in order to transfer measurement data from diagnosis unit 21 to diagnosis unit 18 for further processing, whereby the essential diagnosis is still performed in the backend portion 2. Another option enabled by bi-directional communication is to shift some of the control processes from the backend portion 2 to the frontend portion 1.

In certain situations it may be necessary to provide two or more identical antennas (antenna diversity) at, maybe, different locations or with different directivities. In such a case the antennas or only one of the antennas may be evaluated, but all may be controlled dependent on the assessment of the one antenna/amplifier.

Figure 4:
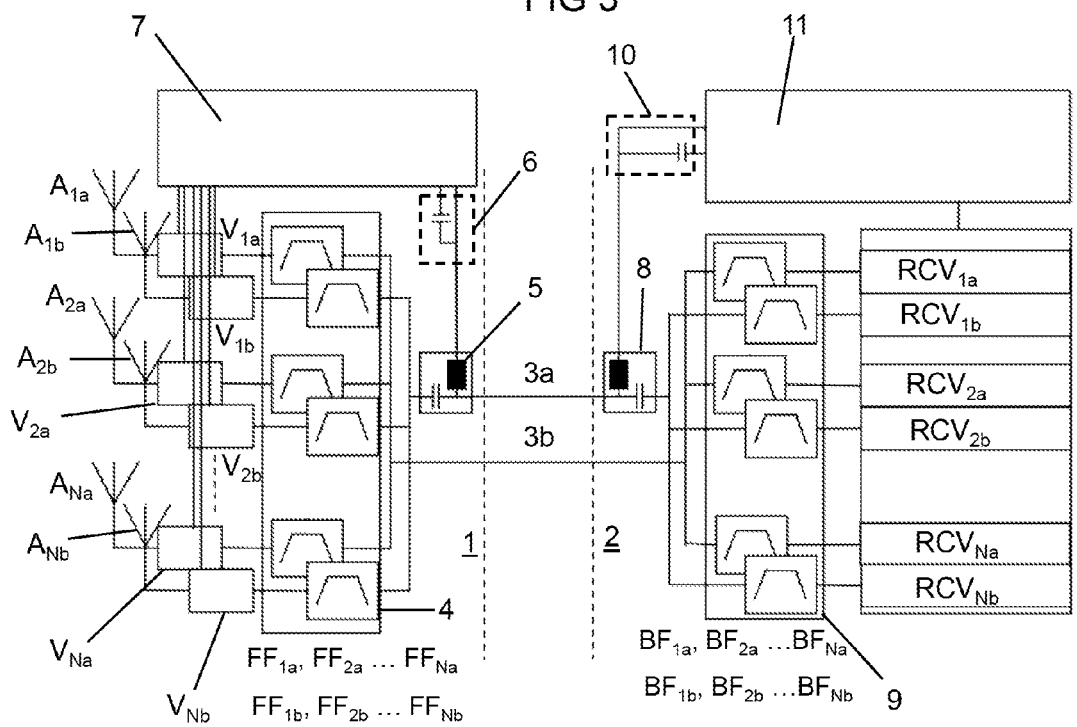
FIG. 4 is a block diagram illustrating another improved multi-band, multi-antenna system.

FIG. 4 depicts N pairs (or N·M) of antennas $A_{1a}, A_{2a} ... A_{Na}; A_{1b}; A_{2b} ... A_{Nb}; (A_{1c}; A_{2c} ... A_{NM})$ and N pairs (or N·M) of amplifiers $V_{1a}, V_{2a} ... V_{Na}; V_{Nb}; V_{2b} ... V_{Nb}$ ($V_{1c}$; $V_{2c} ... V_{NM}$) which are coupled via corresponding pairs of filters $FF_{1a}, FF_{2a} ... FF_{Na}$ and $FF_{1b}, FF_{2b} ... FF_{Nb}$ ($FF_{1c}$, $FF_{2c} ... FF_{NM}$) in the frontend portion 1 and a pair of feed lines 3a and 3b ( ... 3M) with corresponding pairs of filters $BF_{1a}, BF_{2a} ... BF_{Na}$ and $BF_{1b}, BF_{2b} ... BF_{Nb}$ ($BF_{1c}$, $BF_{2c} ... BF_{NM}$) in the backend portion 2. The crossover networks 5 and 8 are connected upstream and downstream of the feed line 3a only. Pairs of receivers $RCV_{1a}, RCV_{2a} ... RCV_{Na}; RCV_{1b}, RCV_{2b} ... RCV_{Nb}$ ($RCV_{1c}, RCV_{2c} ... RCV_{NM}$) are connected downstream of the filters $BF_{1a}$, $BF_{2a} ... BF_{Na}$ and $BF_{1b}, BF_{2b} ... BF_{Nb}$ (and $BF_{1c}, BF_{2c} ... BF_{NM}$) in the backend portion 2. All other components of the frontend portion 1 and the backend portion 2, even if not shown in FIG. 4, may be similar or identical with those explained above with reference to FIG. 1.

Alternatively to the examples outlined above, the DC voltage may not be transferred from the backend portion 2 to the frontend portion 1 via the feed line 3. Instead, the DC voltage for supplying the frontend portion may be derived from a separate supply. Furthermore, instead of the various crossover networks and splitters/combiners in the frontend and backend portion a single crossover network in each the frontend portion 1 and the backend portion 2 may be used.

Although various examples of realizing the invention have been disclosed, it will be apparent to those skilled in the art that various changes and modifications can be made which will achieve some of the advantages of the invention with-out departing from the spirit and scope of the invention. It will be obvious to those reasonably skilled in the art that other components performing the same functions may be suitably substituted. Such modifications to the inventive concept are intended to be covered by the appended claims.

What is claimed is:

1. An antenna system comprising a frontend portion and a backend portion connected to each other by a feed line, in which:
   the frontend portion comprises multiple antennas that supply antenna signals, a first control unit for controlling the frontend portion dependent on control signals received from the backend portion, and at least one first crossover network that connects the feed line to the at least one first crossover network and the first control unit;
   the backend portion comprises multiple receivers, a second control unit that provides the control signals for the first control unit, and at least one second crossover network that connects the feed line to the at least one second crossover network and the receivers; and
   the frontend and backend portions are configured to transmit via the feed line the antenna signals from the frontend portion to the backend portion in certain frequency ranges and to transmit the control signals from the backend portion to the frontend portion in frequency range other than the certain frequency ranges,
   wherein the backend portion comprises a modulator for modulating a carrier signal on the control signals, and the frontend portion comprises a demodulator for demodulating the modulated carrier signal.

2. The system of claim 1, in which the frontend portion is adapted to switch the multiple antennas on and off.

3. The system of claim 1, in which amplifiers including a bias point and a gain are connected downstream of the multiple antennas and the frontend portion is adapted to adjust the bias point and/or the gain.

4. The system of claim 1, in which the backend portion comprises a diagnosis unit that evaluates signals from the multiple receivers to provide information that forms basis for the control signals.

5. The system of claim 4, in which the diagnosis unit is configured to run a diagnosis procedure to measure at least one of current consumption, noise, and signal strength.

6. The system of claim 4, in which the diagnosis unit is configured to switch off all antennas/amplifiers except for a first antenna/amplifier and to run a diagnosis procedure for the first antenna/amplifier.

7. The system of claim 1, in which the backend portion comprises a voltage source that supplies a DC voltage via the feed line to the frontend portion.

8. The system of claim 7, in which
   the control signals form a useful AC control signal;
   the at least one first crossover network is configured to split the signals received from the backend portion into a DC supply signal and the useful AC control signal; and
   the at least one second crossover network is configured to combine the DC supply signal with the useful AC control signal.

9. The system of claim 1, in which the at least one first crossover network is configured to combine the antenna signals to be transferred via the feed line to the backend portion.

10. The system of claim 1, in which the at least one second crossover network is configured to split combined antenna signals received via the feed line into individual antenna signals for individual receivers.

11. The system of claim 1, in which
   the frontend portion comprises another diagnosis unit and another modulation unit; the diagnosis unit provides a diagnosis signal that is modulated on another carrier signal to be transmitted via the feed line to the backend portion that comprises a demodulator to retrieve the diagnosis signal.

12. The system of claim 11, in which the backend portion and the frontend portion comprise modems that form combined modulators and demodulators.

13. The system of claim 1, in which the frontend portion and the backend portion are connected by one or more additional feed lines;
   the frontend portion comprises additional antennas and additional crossover networks that connect the additional antennas to additional feed lines; and
   the backend portion comprises additional receivers and additional crossover networks that connect the additional receivers to additional feed lines.

14. An antenna system comprising:
   a frontend portion including:
      multiple antennas that supply antenna signals;
      a first control unit for controlling the frontend portion dependent on control signals; and
      at least one first crossover network that connects a feed line to the first control unit and to the at least one crossover network; and
   a backend portion including:
      multiple receivers;
      a second control unit that provides the control signals for the first control unit, and
      at least one second crossover network that connects the feed line to the at least one second crossover network and to the multiple receivers;
   wherein the frontend and backend portions are configured to transmit via the feed line antenna signals from the frontend portion to the backend portion in certain frequency ranges and to transmit the control signals from the backend portion to the frontend portion in a frequency range other than the certain frequency ranges,
   wherein the backend portion comprises a modulator for modulating a carrier signal on the control signals, and the frontend portion comprises a demodulator for demodulating the modulated carrier signal.

15. The antenna system of claim 14, in which the frontend portion is adapted to switch the multiple antennas on and off.

16. The antenna system of claim 14, in which amplifiers including a bias point and a gain are connected downstream of the multiple antennas and the frontend portion is adapted to adjust the bias point and/or the gain.

17. The antenna system of claim 14, in which the backend portion comprises a diagnosis unit that evaluates signals from the multiple receivers to provide information that forms basis for the control signals.

18. An antenna system comprising:
   a frontend portion including:
      multiple antennas that supply antenna signals;
      a first control unit for controlling the frontend portion dependent on control signals; and at least one first crossover network that connects a feed line to the first control unit and to the at least one first crossover network; and a backend portion including:
multiple receivers,
a second control unit that provides the control signals for the first control unit, and
at least one second crossover network that connects the feed line to the at least one second crossover network and to the multiple receivers;
wherein the frontend and backend portions are configured to transmit via the feed line, antenna signals to the backend portion in a first frequency range and to transmit the control signals from the backend portion to the frontend portion in a second frequency range that is different than the first frequency range, wherein the backend portion comprises a modulator for modulating a carrier signal on the control signals, and the frontend portion comprises a demodulator for demodulating the modulated carrier signal.

* * * * *